United States Patent [19]

Barnes et al.

[11] Patent Number: 4,787,026
[45] Date of Patent: Nov. 22, 1988

[54] METHOD TO MANAGE COPROCESSOR IN A VIRTUAL MEMORY VIRTUAL MACHINE DATA PROCESSING SYSTEM

[75] Inventors: Johnny G. Barnes; Joe W. Blackard; Rajan Krishnamurty; Terry L. Mothersole, all of Austin, Tex.

[73] Assignee: International Business Machines Corporation, Armonk, N.Y.

[21] Appl. No.: 820,456

[22] Filed: Jan. 17, 1986

[51] Int. Cl.⁴ .................. G06F 13/00; G06F 12/08
[52] U.S. Cl. .................................................. 364/200
[58] Field of Search ............. 364/200 MS File, 300, 364/900 MS File

[56] References Cited

U.S. PATENT DOCUMENTS

| | | | |
|---|---|---|---|
| 4,396,984 | 8/1983 | Yideki, II | 364/200 |
| 4,400,769 | 8/1983 | Kaneda et al. | 364/200 |
| 4,403,288 | 9/1983 | Christian et al. | 364/200 |
| 4,475,156 | 10/1984 | Federico et al. | 364/300 |
| 4,481,583 | 11/1984 | Mueller | 364/200 |
| 4,516,199 | 5/1985 | Frieder et al. | 364/200 |
| 4,527,237 | 7/1985 | Frieder et al. | 364/200 |
| 4,533,996 | 8/1985 | Hartung et al. | 364/200 |

OTHER PUBLICATIONS

"Sharing Resources Between the Main and Coprocessor of a System," IBM Technical Disclosure Bulletin, vol. 29, No. 2 (Jul. 1986), p. 702.

Primary Examiner—Raulfe B. Zache
Assistant Examiner—Robert B. Harrell
Attorney, Agent, or Firm—Richard E. Cummins

[57] ABSTRACT

A method to manage the operation of a coprocessor in a virtual memory type data processing system in which an Input/Output channel and an Input/output channel controller interconnect the coprocessor to the main processor and system memory. A Virtual Resource Manager (VRM) comprising a group of interrelated software programs function in the system to establish virtual machines that execute application programs concurrently. A Coprocessor Manager component of the VRM establishes a Virtual Machine in which the compressor executes application programs that cannot be executed on the main processor. The coprocessor is mounted on an integrated circuit card which is inserted into a 'mother board' socket which contains the main processor and related components.

7 Claims, 4 Drawing Sheets

FIG. 1

| CO-PROCESSOR MANAGER ECB MASK | | | |
|---|---|---|---|
| CO-PROCESSOR VIRTUAL TERMINAL ECB MASK | | | |
| I/O BUS INTERRUPT MASK | COP SIMULATED INTERRUPT MASK | | |
| COP INTERRUPT CONTROL MASK | EVENT FLAGS | | |
| STATUS FLAGS | VIDEO CONTROL | | MONO/PRT CNTL |
| VIDEO RELOCATION AND QUEUE INFORMATION | | | KEYBOARD LEDS |
| RESERVED | RESERVED | DMA ACCESS | CURRENT MODES |
| I/O ADDRESS | I/O DATA | | |

CO-PROCESSOR SOFTWARE STRUCTURE

FIG. 4

METHOD TO MANAGE COPROCESSOR IN A VIRTUAL MEMORY VIRTUAL MACHINE DATA PROCESSING SYSTEM

FIELD OF INVENTION

This invention relates in general to data processing systems which include a coprocessor and, in particular, to a method of managing a coprocessor in a virtual memory virtual machine type data processing system.

CROSS-REFERENCED APPLICATIONS

U.S. Application, Ser. No. 6-706803, filed on Feb. 28, 1985 in the name of P.A. Buckland, et al, entitled "Logical Arrangement for Controlling Use of Different System Displays by Main Processor and Coprocessor," and assigned to the assignee of the present invention, discloses a logical arrangement for the coprocessor of a data processing system to share a number of display devices with the main processor.

U.S. Application, Ser. No. 06/819,458, filed on Jan. 17, 1986, in the name of Duval, et al, entitled "Handling of UNIX* Read and Write System Calls for Mapped Files" and assigned to the assignee of the present invention, discloses a page segmented virtual memory data processing system which establishes virtual machines that operate "concurrently" to process different application programs. This application was allowed on Dec. 31, 1987.

BACKGROUND ART

The prior art discloses various data processing system in which a processor is employed in the system to assist the main processor in the processing of information. Generally, the coprocessor is a special type of processor that excels in performing a specific data processing task, such as floating point arithmetic, which could be relatively time-consuming on a more general purpose type processor.

In other systems, the coprocessor is treated as an equal, and certain protocols and algorithms are established to control the operation of each processor in a manner to ensure that the various applications that are being run by both processors do not interfere with each other.

The prior art also discloses a number of virtual memory virtual machine data processing systems in which a Virtual Resource Manager establishes a virtual machine that operates to execute particular applications "concurrently," in that the system processor or system resources are shared in a time multiplex fashion among the various virtual machines.

While these prior art arrangements operate satisfactorily, they do not provide a solution to a problem that is often faced by the designer of data processing systems and users, where a new system is introduced with a new operating system for which there are no existing application program. The problem involves providing a translation or migration path to permit a customer to continue to run existing programs on the new system and to add new application programs as they are developed, to either provide new function or enhancements to the old applications.

When the new system is not upward program compatible with the customer's existing system and programs, only two practical options exist if the customer wants to take advantage of the enhancements of the new system. The first option is to run both the systems while converting all of the old programs to the new environment. The second option is to attempt to emulate the old programs on the new machine, which generally results in less than optimum performance on the new system.

The present invention provides the relatively economical and novel method to solve the above-described problem.

SUMMARY OF THE INVENTION

In accordance with the method of the present invention, a data processing system is established which comprises a main processor connected to a system memory through a memory manager unit and a coprocessor which is attached to the input/output bus of the system which, in turn, is connected to the main processor through an input/output channel controller. The coprocessor has an architecture that is functionally identical to the prior art system processors, thereby permitting current existing application programs to be run on the coprocessor. The system is provided with a suitable set of programs, referred to as a Virtual Resource Manager (VRM), to establish a virtual machine type environment in which a number of different operating systems are available to be run on the virtual machines that are established by the VRM. These virtual machines generally share the system processor, but one virtual machine can be configured, which employs the coprocessor along with other system resources, thus permitting the system to run all existing programs and take advantage of any other high function components such as displays, printers, etc., that may be associated in the new system.

DESCRIPTION OF THE PREFERRED EMBODIMENT

Figure 1:
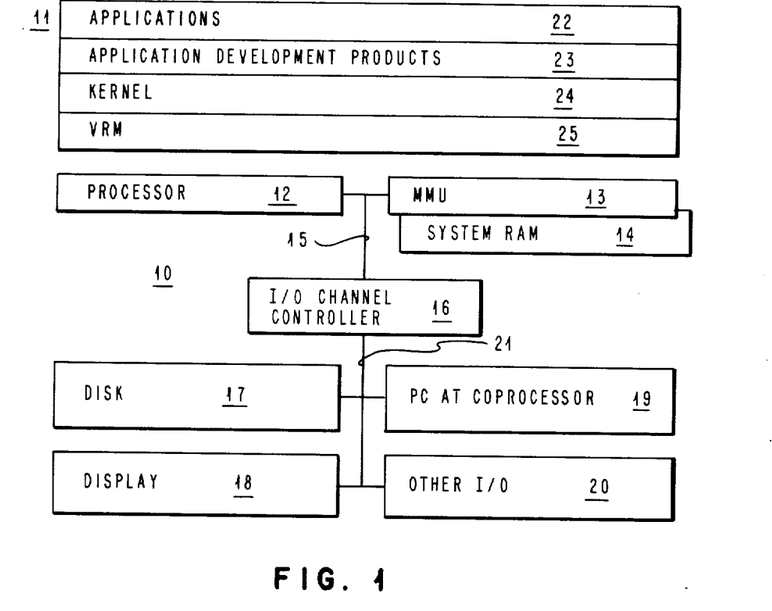
FIG. 1 is a schematic illustration of a virtual memory data processing system in which the method of the present invention may be advantageously employed.

System Overview: FIG. 1 is a schematic illustration of a virtual memory system in which the method of the present invention is employed. As show in in FIG. 1., the system comprises a hardware section 10 and a software or programming section 11. Hardware section 10, as shown, comprises a processor function 12, a memory management function 13, a system memory function or RAM 14, system bus 15, an Input/Output Channel Controller (IOCC) 16, and an Input/Output bus 21. The hardware section further includes a group of I/O devices attached to the I/O bus 21 through the IOCC 16, including a disk storage function 17, a display function 18, a coprocessor function 19, and block 20, representing other I/O devices such as a keyboard or mouse-type device.

The program section of the system includes the application program 22 that is to be run on the system, a group of application development programs 23, or tools to assist in developing new applications, an operating system kernel 24, which, for example, may be an extension of the UNIX system V kernel, and a Virtual Resource Manager program 25, which functions to permit a number of virtual machines to be created, each of which is running a different operating system, but sharing the system resources. The system may operate, therefore, in a multi-tasking, multi-user environment which is one of the main reasons for requiring a large virtual memory type storage system.

Figure 2:
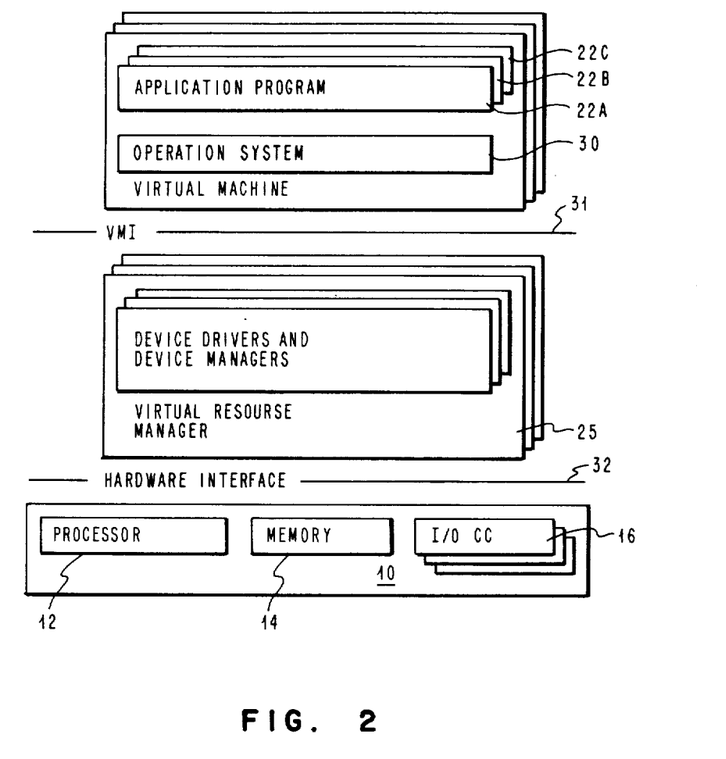
FIG. 2 illustrates the interrelationships of the Virtual Resource Manager (VRM) shown in FIG. 1 to the data processing system and a virtual machine.

FIG. 2 illustrates the relationship of the Virtual Resource Manager 25 to the other components of the system. As shown in FIG. 2, a virtual machine includes one or more application programs such as 22a-22c and at least one operating system 30. A virtual machine interface 31 is established between the virtual machine and the VRM 25. A hardware interface 32 is also established between the VRM 25 and the hardware section 10. The VRM 25 supports virtual memory. It can be assumed, for purposes of explanation, that the memory capabilities of the hardware shown in FIG. 1 includes a 24 bit address space for system memory 14, which equates to a capacity of 16 megabytes for memory 14, and a 40 bit address space for virtual memory, which equates to 1 terabyte of memory. A paged segmentation technique is implemented for the Memory Management Unit 13, so that the total virtual address space is divided into 4,096 memory segments, with each memory segment occupying 256 megabytes.

The details of the arrangement, as shown in FIGS. 1 and 2 including the various data structures that are employed by the Virtual Resource Manager, are set forth in detail in co-pending applications, Ser. No. 06/819,458 which is incorporated herein by reference.

Figure 3:
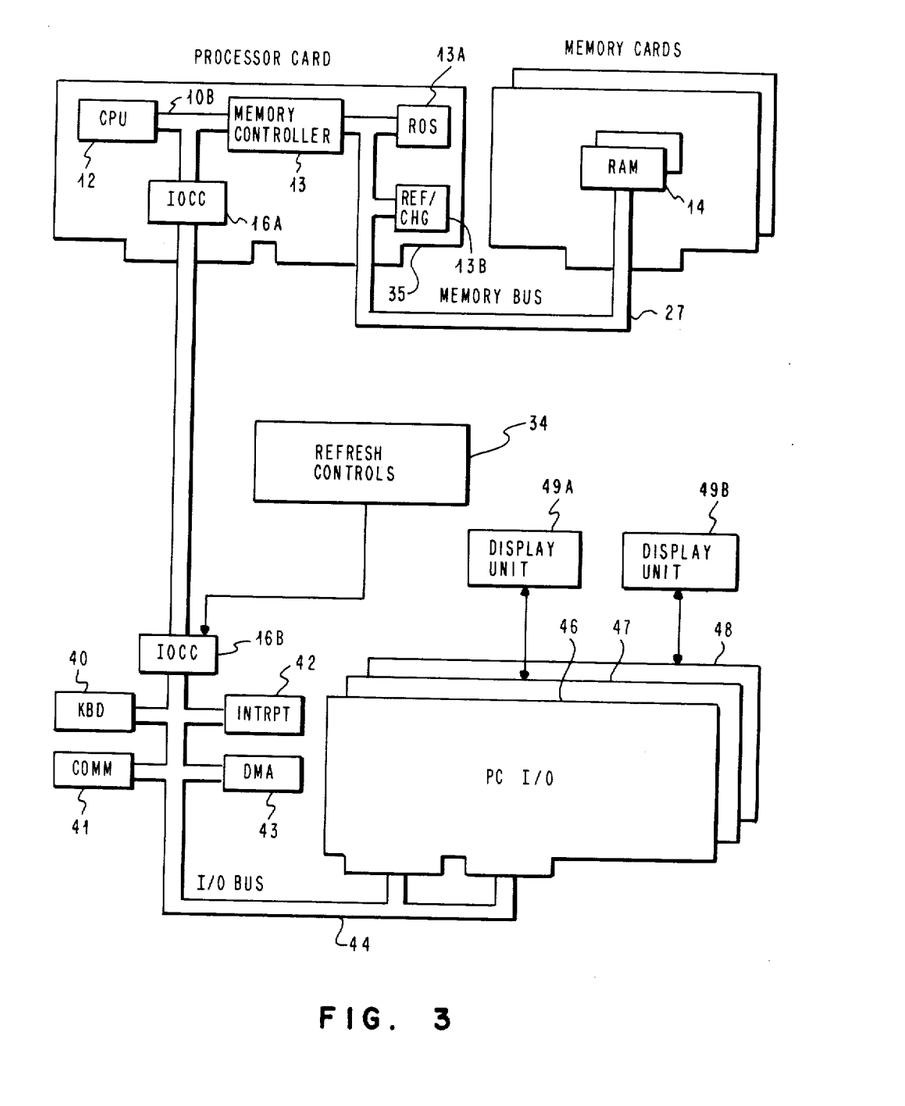
FIG. 3 is a detailed block diagram of the data processing system shown in FIG. 1.

FIG. 3 is a detailed block diagram of the system shown in FIG. 1. As shown, the system comprises a main Central Processing Unit 12, a memory controller 13, a Read Only Storage block 13a, and a refresh charge block 13b. A portion of an Input/Output Channel Controller is shown in block 16a. The functional blocks are depicted as being mounted on a printed circuit card 35, referred to as the processor card. The processor card is arranged to be inserted in a pair of sockets on a mother board which contains sockets for other cards, functional modules such as the refresh control 34, the interrupt controller 42, the Direct Memory Access controller 43, a communications controller 41, and a keyboard controller 40. The mother board also mounts the other portion 16b of the Input/Output Channel Controller function in addition to being provided with a number of multi-conductor buses which carry signals throughout the system. The two main buses, shown in FIG. 1, are the I/O bus 44 and the memory bus 27, which extend from the memory controller on the processor card to the RAM memory 14 on the memory card.

The system shown in FIG. 3 further includes three additional cards, 46, 47, and 48, which are plugged into the mother board and are attached to the I/O bus 44. Card 46 is designated as the coprocessor card and includes the second processing unit in the system, which is referred to as the coprocessor. The coprocessor card 46 may be assumed to be functionally equivalent to the IBM PC/AT Microprocessor System. Cards 47 and 48 are display adapter cards, whose primary function is to act as a conventional video buffer for display devices 49a and 49b. It should be assumed that a reference in this description to a display or display unit encompasses both the tube that is the screen, and the associated electronics included within the video buffer to achieve the display function. The additional electronics provided on the adapter card includes such things as a display controller which comprises a number of registers for controlling various display parameters, etc., all of which are standard controls for the display devices.

The details of the system shown in FIG. 3 are set forth in the cross-referenced application (Ser. No. 6-706803), which is also incorporated herein by reference.

Figure 4:
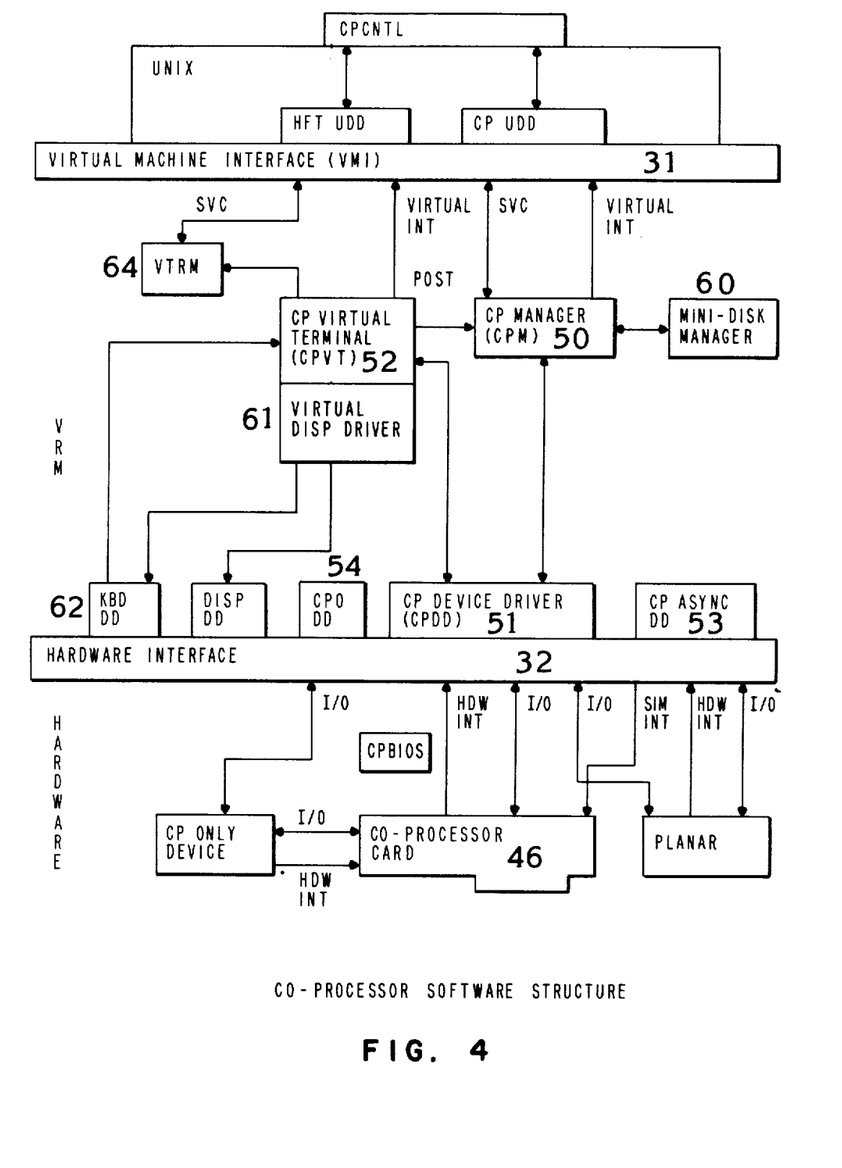
FIG. 4 illustrates the relationships between the coprocessor's subsystem and the rest of the I/O subsystems (IOS).

FIG. 4 shows the relationship between the coprocessor subsystem components and the rest of the system.

The coprocessor VRM subsystem consists of the Coprocessor Manager 50, the Coprocessor Device Driver 51, the Coprocessor Virtual Terminal 52, the Coprocessor Async. Emulation Device Driver 53, and the Coprocessor Only Device Driver 54 subcomponents. A virtual machine can configure and start the coprocessor 19 by issuing the appropriate Define Code and/or Define Device Supervisor Call (SVCs) to load the various coprocessor subcomponents to VRM. Configuration information is then passed to the Coprocessor Manager in the form of Send Command SVCs. The device options field in the Send Command SVC is used to request the various services provided by the Coprocessor Manager 50. The configuration information consists of:

the amount of memory to be allocated to the coprocessor
minidisks to be attached to the coprocessor
system display(s) usage (access, mode)
adapter cards to be attached to the coprocessor
logical association of communication ports to communication adapters
whether or not the user is to be informed of coprocessor accesses to unallocated devices The Coprocessor Manager 50 allocates the memory required, copies the BIOS and ROM BASIC into write protected memory and attaches to the specified devices. It then initializes and starts the coprocessor. The virtual machine must be able to handle unsolicited interrupts from the coprocessor VRM component to terminate the coprocessor environment or to inform the user of coprocessor accesses to devices that it does not own. It must also issue a terminate command to the Coprocessor Manager 50 before deleting any of the coprocessor subcomponents from VRM. With the hardware support provided on the coprocessor card 46, the coprocessor 19 is easily prevented from accessing devices that are not allocated to it. However, the processor 12 does not have the ability to block off I/O ports, so the device drivers must respect any allocation to the coprocessor 19. Any time both processors attempt to access the same device, the results are unpredictable.

The Coprocessor Device Driver 51 controls the coprocessor 19 by appropriately setting registers on the coprocessor card 46, by responding to interrupts generated by the coprocessor card 46, and by standard mechanisms for dealing with memory 14 and the VRM I/O Subsystem.

FUNCTIONAL CHARACTERISTICS

The coprocessor VRM component manages the coprocessor environment. It establishes the configuration and handles routing among the coprocessor VRM components and the operating system component. Only one virtual machine can attach to the Coprocessor Manager 50 at a time. Although it is dependent on code running in the operating system in a virtual machine, it is not dependent on a particular operating system. An application running in any operating system on the VRM can start and run the coprocessor provided that it meets certain interfaces and expectations:

The application must provide the user interface for starting, stopping, and configuring the coprocessor environment and devices.

The coprocessor VRM component is not part of the base VRM therefore it must be installed from above the operating system.

The coprocessor must be configured by using the configuration services provided by the Coprocessor Manager.

The application must open a virtual terminal for the coprocessor (this is required even if the coprocessor drives the display directly).

The application must be able to accept and handle return codes from these calls.

The application must accept virtual interrupts from the coprocessor VRM component.

The coprocessor VRM component consists of the following subcomponents.

Coprocessor Manager (CPM) 50
Coprocessor Virtual Terminal (CPVT) 52
Coprocessor Device Driver (CPDD) 51
Coprocessor Async. Emulation Device Driver (CPADD) 53
Coprocessor Only Device Driver (CPODD) 54 which are not to be confused with processes or programs. Each of these pieces may contain more than one VRM process and is composed of several routines (some of which run synchronously with the caller).

COPROCESSOR MANAGER

The Coprocessor Manager 50 is a VRM device manager that is responsible for handling the coprocessor card 46. In addition to providing device manager functions for the Coprocessor Device Driver 51, the Coprocessor Manager 50 attaches to devices in the name of the coprocessor. All dedicated devices that the coprocessor uses must be attached by the Coprocessor Manager 50. This attachment not only prevents a virtual machine from using the device, it also prevents the VRM device driver from accessing that device. Shared devices must be managed by the Coprocessor Manager 50 through the appropriate VRM services (e.g., disk requests are routed through the Minidisk Manager 60).

The Coprocessor Manager provides the following functions:

accepts commands from the virtual machine interface 31 to start, stop, and configure the environment and devices accepts status from the Coprocessor Device Driver 51 concerning errors and functions to be performed interrupts the virtual machine interface 31 to report errors owns devices, making them unavailable to the virtual machine interface 31 terminates the coprocessor and releases all resources

COPROCESSOR VIRTUAL TERMINAL

The coprocessor virtual terminal mode processor 52 is responsible for creating and maintaining the virtual terminal for the coprocessor. It utilizes the VDD (Virtual Display Driver) interface 61 to set keyboard mode indicators, bind appropriate display second level interrupt handles, select a display for the coprocessor virtual terminal, and to emulate PC Monochrome and PC Color Graphics modes on non-PC displays. Providing display managment and processing of keyboard input, it is the second type of mode processor handled in the VRM, the primary being High Function Terminal (HFT). The only interface factor that distinguishes the coprocessor virtual terminal from other mode processors, in the eyes of the VRM, is that the code already exists (a module copy does not have to be performed by the VTRM). The functions it provides are:

allocates a relocated video buffer and passes the address to the coprocessor card 46 to write to when it does not own the display.

allocates a video queue and a display conversion buffer (graphics only) when emulating PC Monochrome or PC Color Graphics modes on a non-PC display.

receives keyboard position codes from the keyboard device driver 62 and converts them to PC or PC AT scan codes to pass to the Coprocessor Device Driver 51.

receives notification from the Coprocessor Device Driver 51 to update a non-PC display adapter. The Coprocessor Virtual Terminal 52 will then make the appropriate calls to the VDD 61 (Virtual Display Device Driver).

receives VTRM queue elements to activate/deactivate/close the virtual terminal process by restoring/saving the state of the display.

receives notification from the Coprocessor Device Driver 51 to change the keyboard mode and to toggle the keyboard LEDs.

COPROCESSOR DEVICE DRIVER

The Coprocessor Device Driver 51 handles the coprocessor card 46, it does not handle any other devices that the coprocessor uses. The functions it provides are:

resets and initializes the coprocessor card 46 to a predetermined state. All addresses are trapped and emulated until the Coprocessor Manager 50 or the Coprocessor Virtual Terminal 52 requests that the addresses be released.

fields the following interrupts from the coprocessor card 46:
interrupt when the coprocessor has been stopped
interrupt due to an I/O Trap
interrupt due to a relocated video buffer write
interrupt for video queue full/video warning
interrupt when the coprocessor tried to access the system speaker The Coprocessor Device Driver 51 will collect the information regarding the interrupt and then process the interrupt Off Level (i.e., the coprocessor interrupt is reset before the interrupt is actually processes—this allows other device interrupts to be processed in the meantime). The Coprocessor Device Driver 51 will provide emulation for the majority of the interrupts; however, if the interrupt requires further processing, it will be routed to the Coprocessor Manager 50 or the Coprocessor Virtual Terminal 52 appropriately.

accepts commands from the Coprocessor Manager 50 and the Coprocessor Virtual Terminal 52 to handle the coprocessor environment:

start, stop or reset the coprocessor
allow I/O for direct access devices
simulate interrupts
pass data to the coprocessor for selected trapped inputs
terminate the coprocessor activity and release all resources.

COPROCESSOR ASYNC. EMULATION DEVICE DRIVER

The Coprocessor Async. Emulation Device Driver 53 provides routines which redirects I/O between the coprocessor and the PC async. adapter to one of the two planar async. ports. Data bytes containing control information being sent will be translated from the PC async. adapter format to the planar async. adapter format and redirected to the async. ports on the planar. Data bytes containing control information being received from the async. ports on the planar will be translated from the planar async. adapter format to the PC async. adapter format and redirected to the coprocessor.

COPROCESSOR ONLY DEVICE DEVICE DRIVER

The Coprocessor Only Device Device Driver 54 provides for the definition, initialization, and termination of devices used only by the coprocessor. These routines are invoked when the device is defined to VRM and when the Coprocessor Manager 50 attaches to and detaches from the device for the coprocessor. This device driver does not provide any interfaces to control the device during normal operation. The coprocessor drives the device directly while the Coprocessor Manager 50 is attached to the device.

COPROCESSOR VIRTUAL TERMINALS

The VRM supports 2 types of virtual terminals - High Function Terminals and Coprocessor Virtual Terminals.

The Coprocessor 64 Virtual Terminal Mode Processor receives keyboard input and manages the display, with the aid of off-level coprocessor device driver routines. Key position codes are converted to PC AT or PC scan codes. There are no keyboard configuration options available to the coprocessor user.

A system display may be accessed by the coprocessor as either a shared device or as a dedicated device. In the shared environment the coprocessor may access the display adapter in the following mode:

Monitored—The display adapter is switched between the main processor and the coprocessor via a hot key (ALT-ACTION). Each CPU may modify the adapter while in control. The screen data and adapter state are restored when switching between the two processors. All I/O commands from the coprocessor are trapped and saved to allow the display adapter state to be restored when control is returned to the coprocessor. When the display adapter is the PC Monochrome or the Enhanced Color Graphics Adapter, the video buffer is accessed directly by the coprocessor. When the display adapter is the IBM Advanced Monochrome Graphics, video buffer accesses are relocated to system memory and the IBM Advanced Monochrome Graphics virtual display driver is used to update the screen.

A system display may be dedicated to the coprocessor in one of two ways:
Direct—The coprocessor drives the system display directly—no relocated video or trapped I/O. The display cannot be switched between the main processor and the coprocessor via the ALT-ACTION key sequence. The CTL-ALT-ACTION key sequence is required to terminate the coprocessor session and return the display to the system.
Allocate display to coprocessor—This is allowed only if there are multiple system displays and the main processor is not using the display to be allocated to the coprocessor. If the coprocessor is not also using another system display in direct mode, then the ALT-ACTION key sequence may be used to move around the virtual terminal ring without terminating the coprocessor session.

In a system with multiple displays, the coprocessor may use more than one display, however only one of them may be in monitored or direct mode. Other displays used by the coprocessor have to be allocated to it and made unavailable to the main processor for the duration of the coprocessor session.

The display configuration consists of specifying the following information for each display that the coprocessor uses:
the display access
  monitored
  direct
  allocated
the display mode
  PC mono
  PC color
the display type
  PC monochrome adapter/monitor.
  IBM Advanced Monochrome Graphics adapter/monitor.
  Enhanced Color Graphics Adapter/Enhanced Color Display monitor.
  Enhanced Color Graphics Adapter/PC monochrome monitor.
the primary coprocessor display.
the device identifier for the adapter/monitor combination

COPROCESSOR DEDICATED DEVICES:

A dedicated device is one that is allocated to the coprocessor for the duration of the coprocessor session. Except for the shared devices listed previously, no devices on the I/O bus may be shared. Configuration of the coprocessor is completed by declaring which I/O devices are to be attached to the coprocessor. For each device to be allocated to the coprocessor. For each device to be allocated to the coprocessor, the Coprocessor Manager 50 will use VRM to allocate the device for the coprocessor. If the device can be used by direct I/O, then the Coprocessor Manager 50 sets the trapping logic for that device (address) to allow the coprocessor direct access to the device. If the device is to be emulated, the Coprocessor Manager 50 does not change the trapping logic on the coprocessor card.

COPROCESSOR VRM SUBSYSTEM INITIATION AND TERMINATION

The virtual machine must perform the following actions prior to establishing the coprocessor environment:

1. Issue a Define Code SVC for the Corprocessor Virtual Terminal 52.
2. Issue a Define Code SVC and Define Device SVC for the Coprocessor Device Driver 51.
3. Issue a Define Code SVC and Define Device SVC for the Coprocessor Async. Emulation Device Driver 53.
4. Issue a Define Code SVC for the Coprocessor Only Device Device Drive 54.
5. Issue a Define Device SVC for each coprocessor only device.
6. Issue a Define Code SVC and Define Device SVC for the Coprocessor Manager 50.

The virtual machine must perform the following steps to start the coprocessor for the first time or to restart the coprocessor following a previous termination of the coprocessor session:
1. Attach to the Coprocessor Manager 50.
2. Load BIOS and BASIC into memory.
3. Open the coprocessor 19.
4. Configure the coprocessor environment, using the configuration services provided by the Coprocessor Manager 50.
5. Open a virtual terminal for the coprocessor 19.
6. Issue a command to the Coprocessor Manager 50 to start the coprocessor.

The virtual machine must perform the following actions to terminate a coprocessor session:
1. Close the coprocessor 19.
2. Close the Coprocessor Virtual Terminal 52.
3. Detach from the Coprocessor Manager 50.

The virtual machine must take the following steps to delete the coprocessor VRM support code and the coprocessor only devices from the VRM.
1. Use the delete form of the Define Device SVC to delete all coprocessor only devices.
2. Use the delete form of the Define Device SVC and Define Code SVC to delete the Coprocessor Only Device Device Driver and its associated code.
3. Use the delte form of the Define Device SVC and Define Code SVC to delete the Coprocessor Async. Emulation Device Driver and its associated code.
4. Use the delete form of the Define Device SVC and Define Code SVC to delete the Coprocessor Device Driver and its associated code.
5. Use the delete form of the Define Device SVC and Define Code SVC to delete the Coprocessor Manager and its associated code.
6. Use the delete form of the Define Code SVC to delete the Coprocessor Virtual Terminal.

INTERFACES FOR VIRTUAL MACHINES

Commands for managing the coprocessor are sent to the Coprocessor Manager via the Send Command SVC. The virtual machine must have previously attached to the Coprocessor Manager 50 via the "Attach Device SVC." The IODN specified with the Send Command is the Coprocessor Manager's IODN.

Device Options Supported include:
2 = Open the Coprocessor
3 = Close the Coprocessor
5 = Allocate Main Memory
6 = Load ROM
7 = Configure Coprocessor Display
8 = Allocate Device to Coprocessor
9 = Interrupt on Unallocated Device Access
10 = Allocate Minidisk
11 = Redirect Asynchronous Communications Ports
12 = Start the Coprocessor
13 = Set Debug Options These operations are performed either synchronously or asynchronously. Notification is received on the level and sublevel that was specified when the operating system attached to the Coprocessor Manager 50.

Unsolicited interrupts are sent to the virtual machine when the coprocessor attempts to access a device that is not allocated to it. The coprocessor is stopped until the virtual machine resolves whether the coprocessor can be allowed to continue or if it must be terminated.

An unsolicited interrupt is also issued to inform the virtual machine to terminate the coprocessor session.

An operating system command, PCSTART, is provided to the user to tailor the configuration of the PC AT environment. PCSTART allows the user to select a combination of system resources that are to be attached to the coprocessor. The user may optionally save this configuration in a default profile to be used in future initiations of the coprocessor. PCSTART also provides a prompting mode for the casual user, in which the user is first shown the current default value of a parameter and has the option to alter its value.

There is no memory on the coprocessor card 46, so memory is provided as a mixture of system memory and I/O channel-attached memory. Memory is first allocated from the cards plugged into I/O channel. If there is not enough channel-attached memory (there might not be any), the rest is provided form system memory and pinned to prevent page faults. This is accomplished by setting up the IOCC to convert the I/O channel addresses to the appropriate virtual addresses. The virtual addresses use the MMU segment register that is dedicated for I/O device access to system memory. Channel-attached memory must being at address 0 and be continuous if it is to be recognized and used by the coprocessor. The amount of system memory that is available to the coprocessor depends upon how much is left after VRM and the operating system have met their requirements.

Devices connected to the I/O channel are supported in different ways, depending on the specific attributes of the device. The following definitions describe the range of device support:

Main Processor Only—the device is available only to the main processor.

Shared—a device is shared when it can either be accessed by both processors concurrently (e.g., disk, DMA) or can be dynamically switched between them (e.g., the display). Device sharing is accomplished by allowing only the main processor to issue the I/O commands to the device.

Dedicated—the device is allocated to the coprocessor for the duration of the coprocessor session. If the device is PC AT-compatible (e.g., planar serial ports), coprocessor accesses to it go directly to that device with no intervention. If the device is not PC AT-compatible, coprocessor accesses to it are trapped and emulated by the main processor.

Coprocessor only—available only to the coprocessor. Either the main processor is unable to get to it or the device is never allocated to the main processor.

KEYBOARD

The keyboard 40 is a shared device between the main processor and the coprocessor. Residing in the VRM coprocessor terminal support code are a device driver and a mode processor that provide a PC AT keyboard controller interface to the coprocessor. The mode processor takes in key positions from the VRM keyboard device driver, translates them to PC or PC AT scan codes, places them in a simulated keyboard buffer, and then generates an interrupt to the coprocessor. The scan code sets for PC and for PC AT are stored in a structure indexed by the type of the emulated keyboard. The simulated keyboard buffer is a 16-byte FIFO queue with a 17th byte for overrun.

The keyboard layout of the XX XX keys is a superset of a PC AT keyboard. It contains all of the engravings resident of a PC AT keyboard, while some of them have been moved or duplicated to other key positions. For example, the new set of cursor motion keys and edit keys (INS, DEL, PAGE UP, PAGE DOWN, HOME, and END), will be translated as engraved, without numbers. the coprocessor virtual terminal will maintain state flags for the NUMLOCK and the SHIFT keys, as well as for the CAPSLOCK, SCROLL LOCK, CTRL, and ALT. Depending on the combined state of the NUMLOCK and the SHIFT, SHIFT make/breaks may be sent around the scan codes for the new native cursor motion and edit keys, in order to force the engraved key translation.

From a system perspective, the coprocessor mode processor works with the VRM keyboard device driver in raw mode—receiving all makes and breaks of keys. During virtual terminal transitions, the break of keys may be sent to the next active terminal. Since the mode processor keeps track of the control/shift keys, it can send break scan codes appropriately. The mode processor also traps the situation where the user wishes to terminate the coprocessor session with the CNTL-ALT-ACTION key sequence. This simulates the user entering the PCEND command in the AIX operating system.

DISK

The fixed disk devices on the system are divided into logical minidisks that are managed by the minidisk manager. PC AT fixed disks are emulated through the use of minidisks. Up to two minidisks can be allocated to the coprocessor during a given session. The only interface to the fixed disk from the coprocessor is through BIOS. Any attempts to issue I/O instructions to the physical disk addresses are trapped by the coprocessor card and are interpreted as unallocated device accesses.

ASYNC REDIRECTION

There exists a coprocessor async device driver 53 that will emulate serial port functions of the PC AT serial/parallel card on the native planar serial ports. I/O between the coprocessor and the PC AT Serial/Parallel card is redirected to one of the two planar async ports. Control information being sent will be translated from the PC AT Serial/Parallel card format to the planar serial port format and redirected to the async ports on the planar. Data bytes containing control information being received from the async ports on the planar will be translated from the planar serial port format to the PC AT serial port format and redirected to the coprocessor.

VIRTUAL MACHINE INTERFACES

The coprocessor virtual terminal mode processor 64 virtual machine interface has one purpose: inform the virtual machine that the user wishes to terminate the virtual terminal. The user may terminate the coprocessor by entering the PCEND shell command from the console, or by using the CTL-ALT-ACTION key sequence. The latter will cause the coprocessor mode processor to send an unsolicited interrupt to the virtual machine with a completion code.

INTERFACES FOR VTRM

The coprocessor virtual terminal mode processor 64 main section is queue driven. The VTRM 64 to CPVT 52 communication consists of a Command loop comprised of a queue serviced by the CPVT 52 for commands from the VTRM 64. The queue elements described below are enqueued in the coprocessor virtual terminal mode processor command queue by the VTRM 64.

(a) CLOSE QUEUE ELEMENT: Upon receipt of this queue element the CPVT will take whatever actions are needed prior to its termination and acknowledge completion of processing this queue element to the VTRM 64.

(b) ACTIVATE QUEUE ELEMENT: This queue element is sent to Coprocessor virtual Terminal Mode Processor 64 when its virtual terminal is to be activated. For monitored mode, the Coprocessor Virtual Terminal Mode Processor 64 will perform these functions:
stop coprocessor
activate VDD
if PC or Enhanced Color Graphics Adapter adapter:
  restore the display with contents of relocated video buffer
  reinstate video ports
  start the coprocessor For direct access to system display, the Coprocessor Virtual Terminal Mode Processor 64 will perform these functions: (only a one time activation)
start the coprocessor For direct access to non-system display, the Coprocessor Virtual Terminal Mode Processor 64 will perform these functions:
note activation. The total function of the coprocessor virtual terminal during this mode, is to receive keystrokes from the Keyboard Device Driver and route them to the coprocessor. therefore, no display related action is taken.

(c) DEACTIVATE QUEUE ELEMENT: Upon receipt of this queue element the CPVT 52 will stop the coprocessor, save off the video buffer contents, and save the I/O port values. This queue element is sent to Coprocessor Virtual Terminal Mode Processor 64 when its virtual terminal is to be deactivated. This queue element is never sent to CPVT if in direct mode, since VDD was earlier sent a command to gate off deactivate requests. For monitored mode, the Coprocessor Virtual Terminal Mode Processor 64 will perform these functions:
stop coprocessor
if PC or Enhanced Color Graphics Adapter adapter:
  allocate a relocated video buffer and send address to coprocessor card
  transfer display contents to this relocated video buffer
start coprocessor The CPVT 52 to VTRM 64 communication consists of a Command loop comprises of a queue serviced by the VTRM 64 for commands from the CPVT 52. The Coprocessor Virtual Terminal 52 sends the VTRM the following queue elements:

CLOSE REQUEST—this queue element is sent to VTRM when the CPVT has received a DETACH queue element from the virtual machine. This action requires the detached component to close itself out. CPVT will then wait for a close queue element from VTRM.

INTERFACES FOR COPROCESSOR DEVICE DRIVER

The CPDD 51 will post the CPVT 52 when it gets an interrupt from the coprocessor that warrants virtual terminal emulation:

video updates—if the display adapter is not the APA-8 Monochrome, CPD off-level process can handle the I/O traps and update the screen. But if the display adapter is the APA-8 Monochrome, CPD off-level process will process the I/O traps to a point, then will post CPVT 52 to take care of updating the screen. CPVT 52 needs to be called to do it since it is bound directly to the virtual display device driver (VDD) which is used to update the APA-8 Monochrome screen. Actions to be done by CPVT would include calling these VDD commands:

Set Mode
Set Color Table
Draw Text
Scroll
Move Cursor
Define Cursor
Update ERA keyboard commands PC AT mode indicator(s) changed. A call is made to the VDD to update the state of the LEDS keyboard.

keyboard switch. Updates index variable which points to either the PC scan code table of the PC AT scan code table.

COPROCESSOR DEVICE DRIVER

The Coprocessor Device Driver 51 is a collection of routines which are used to communicate with and control the coprocessor adapter card 46. These routines offer a cleaner interface to the coprocessor. Each routine is a synchronous subroutine which performs a specific function and then returns to the caller. Each of the Coprocessor Device Driver routines may use any other Coprocessor Device Driver routine except for the VRM Service routines. The Service routines may only be called by VRM Process Management.

COPROCESSOR DEVICE DRIVER SERVICE ROUTINES FOR VRM

The Coprocessor Device Driver VRM service routines are a set of subroutines which are necessary for any base VRM device within the system. The two following routines are required from a system standpoint for proper execution. These routines will only be called by VRM Management routines; they are not to be used by processes or virtual machines within or above the VMI.

MAIN PROCEDURE

CPDMAIN is the main entry point for the Coprocessor Device Driver 51 code module. This routine is comprised of the following basic device driver functions;

Define Device

This service is called when the Define Device SVC is issued for the Coprocessor Device Driver 51 Module by the virtual machine. At this time, the Second Level Interrupt Handler (SLIH) is not created or attached to the proper interrupt level; therefore, the interrupts from the coprocessor are disabled at this time. This precaution must be taken, since any interrupt from the coprocessor would go unprocessed and would hang the system. The input parameter for this routine is the DDS (Define Device Structure) which is taken and stored into the routine's static area. The DDS is then checked for validity and an error code is returned to VRM if the DDD is found to be invalid. Otherwise, the address of where the DDS is stored is returned as the return code to Process Management.

Device Initialization

This service is called as a result of the Coprocesor Manager 50 issuing an "Attach Device" to the Coprocessor Device Driver 51. The coprocessor will be IPLed (i.e., the CPD_POR routine will be called) and all interrupts will be blocked off. The coprocessor will be initialized to trap on all I/O addresses and all necessary video information will be set. All common data areas will also be initialized.

As part of the VRM "Attach Device" service, the device's Second Level Interrupt Handler (SLIH) is attached to the appropriate interrupt level. The SLIH ID, Device ID (DID) and the Module ID (MID) can be determined and saved for future reference by looking in the structure passed as an input parameter to this routine. the VRM $Change function is called at this time in order to change the entry points for the SLIH and Off Level Processing routine for faster response time to the coprocessor interrupts.

Device Termination

The terminate routine is called as a result of the Coprocessor Manager 50 issuing an "Attach Device" with the stop option specified to VRM for the Coprocessor Device Driver 51. This service terminates the coprocessor application and its support. The coprocessor is stopped and all resources are released back to the VRM. The coprocessor 19 will be returned to the same equivalent state as when the Define Device routine is called. This way, the Coprocessor Device Driver 51 can be attached again without requiring the virtual machine to issue another Define Device SVC.

Exception Handler

The Exception handler is executed whenever a SIGNAL (i.e., software interrupt) is sent to the Coprocessor Device Driver 51. This routine processes timer signals sent from VRM TIMER Management and terminate signals from other processes. This routine will return a return code of (−1) any time a terminate signal is received from a process. The only way to terminate the coprocessor is for the Coprocessor Manager 50 to issue an "Attach Device" with the stop option specified.

I/O Initiate

The I/O Initiate function is called when a queue element has been placed on the Coprocessor Device Driver's queue. The only queue element which the Coprocessor Device Driver 51 should receive is a CONTROL element with Operations Options field set for "detach operation." The Coprocessor Device Driver 51 will read the queue element and the dequeue the element. If any other queue element besides the "detach element" is received, the Coprocessor Device Driver 51 will log an error and continue.

VRM Process Management will call CPDMAIN with two parameters: (1) the type of function requested and (2) the input parameter required for the function called.

SECOND LEVEL INTERRUPT HANDLER (SLIH)

The coprocessor SLIH will be called by the First Level Interrupt Handler (FLIH) which is attached to the interrupt level where the interrupt occurred. Since multiple interrupt levels can be funneled into one main processor interrupt level, it is necessary for the FLIH to poll all connected SLIH's to determine which SLIH the interrupt belongs to. When the coprocessor SLIH is first called, it will check to see if the coprocessor caused the interrupt. If the coprocessor was not responsible for the interrupt, then the SLIH will return with a return code of (2). Else, the SLIH will process the interrupt and then return.

The coprocessor Second Level Interrupt Handler's main function is to process interrupts asserted by the coprocessor card. There are five types of interrupts which may occur, depending upon how the coprocessor interrupt control register is set. The five types are as follows:
 interrupt when the coprocessor has been stopped
 interrupt due to an I/O Trap
 interrupt due to a relocated video buffer write
 interrupt for video queue full/video warning
 interrupt when the coprocessor tried to access the system speaker Upon receiving the interrupt, the SLIH will gather all the information from the adapter necessary for the complete processing of the interrupt. Otherwise, the SLIH will schedule the interrupt to be processed OFF LEVEL by returning with a return code equal to the address of the DDS. The Off Level Processing routine of the SLIH will be called when there are no interrupts active on the interrupt level of the main processor. This routine will process the interrupt and restart the coprocessor. If the interrupt is to be serviced by either the Coprocessor Manager or the Coprocessor Virtual Terminal (i.e., data returned for an I/O Read Trap), the the off-level process will post the Coprocessor Manager 50 or the Coprocessor virtual Terminal 52 appropriately.

The following are routines which may be used by either the Coprocessor Manager 50 or the Coprocessor Virtual Terminal. The first four offer general control functions of the coprocessor environment. The CPDDRET routine is used to return data to the coprocessor as part of the interrupt handling process for a Trapped I/O Read. CPDTRAP and CPDINIT are used for initialization purposes.

POWER ON RESET (POR) COPROCESSOR

This facility is used to re-IPL the coprocessor without having to power off or re-IPL the main processor. If a program was running in the coprocessor, it is terminated as if the operator had turned the power off and back on. The processor complex (i.e., timers, interrupt controllers, etc.) and general state is reset. However, the trap logic for the I/O address and the video and queue information remain unchanged.

START COPROCESSOR 19

This service is used to start the coprocessor. It can also be thought of as a Resume operation; therefore, the coprocessor must have been configured previous to calling this routine. This service is called by both the Coprocessor Manager 50 and the Coprocessor Virtual Terminal 52 for the initial start-up and to continue after the coprocessor has been stopped. It is the responsibility of the caller to ensure that whatever caused the coprocessor to stop has been handled, before allowing the Coprocessor Device Driver 51 to continue.

STOP COPROCESSOR

This service is used to stop the coprocessor. This service is called by both the Coprocessor Manager 50 and the Coprocessor Virtual Terminal 52 to stop the coprocessor for device changes that require an externally generated (but temporary) stop in activity. It is the responsibility of the caller to ensure that whatever caused the coprocessor to stop has been handled before allowing the coprocessor to continue.

SIMULATE INTERRUPT TO COPROCESSOR

This routine allows the caller to assert an interrupt on a specific interrupt level to the coprocessor. The Coprocessor Virtual Terminal 52, for example, will use this routine to simulate a keyboard interrupt to the coprocessor. The Coprocessor Async. Emulation Device Driver 53 will call this routine to simulate an interrupt from the Planar Async. ports.

TRAP I/O READ DATA RETURN

This routine is indirectly part of the interrupt handling process. When the coprocessor issues a Read to an I/O address which is trapped, the coprocessor asserts the interrupt line. As a result of the interrupt, the CPD OFF LEVEL routine is executed. This will determine where the coprocessor is trying to read and who should return the data. If the Coprocessor Manager 50 or the Coprocessor Virtual Terminal 52 are responsible for the port, then the respective component will be signaled. When the Coprocessor Manager or the Coprocessor Virtual Terminal have acquired the requested data, they then call this routine to pass the data to the coprocessor. Once the data is written to the coprocessor, the trap is cleared and the coprocessor is allowed to proceed.

TRAP I/O SET/RESET

The calling process uses this routine to inform the coprocessor how to interpret each I/O address of the 64K available I/O addresses. Starting at zero, each group of 8 addresses can be set for one of the following actions:
 Allow coprocessor direct access to this port (no trap)
 Trap and ignore or Trap and remind Coprocessor Manager 50 to interrupt virtual machine.
 Trap and inform Coprocessor Manager 50.
 Trap and inform Coprocessor Virtual Terminal 52.
 Trap and emulate by Coprocessor Device Driver 51.

Upon initialization, the coprocessor will be set to trap on all I/O addresses. The Coprocessor Manager 50 and the Coprocessor Virtual Terminal 52 may then set which ports should be allowed access to. The call to the Coprocessor Device Driver is: CALL CPDTRAP (Start_addr, Length, Set_flag)

INITIALIZE/TERMINATE COPROCESSOR

This facility is used by the Coprocessor Device Driver Main procedure to initialize the COPROCESSOR adapter card 46. This procedure is also used by the Coprocessor Manager 50 to terminate the session. The coprocessor application will be halted and the COPROCESSOR adapter will be PORed. The trap logic will be reset to trap on all addresses and the video and queue parameters will be reset to the default values.

POSTS TO COPROCESSOR MANAGER AND COPROCESSOR VIRTUAL TERMINAL

Figure 5:
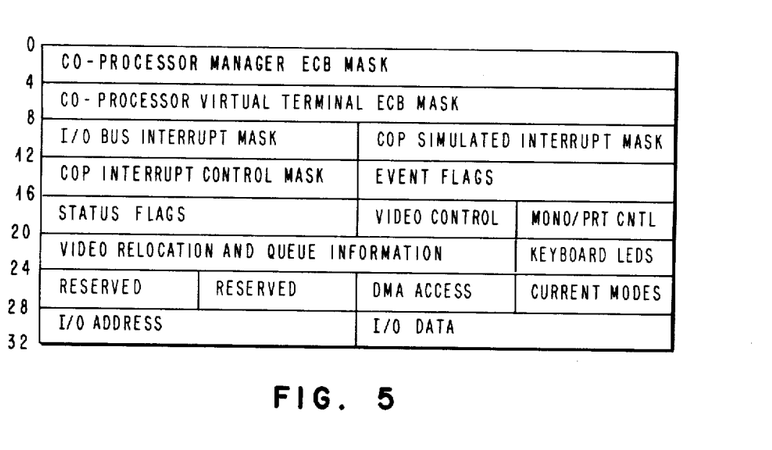
FIG. 5 illustrates the coprocessor event block data structure.

Posts will be used as a means of asynchronous communications between the coprocessor VRM components. Each COPROCESSOR component upon receiving an Event Control Block (ECB) via the Post, will be required to update the appropriate section within the COPROCESSOR Event Block 70 (CEB) as shown in FIG. 5. The CEB 70 is part of the COPROCESSOR VRM components' common data area. The CEB 70 may be read by any COPROCESSOR component for valuable information relating to current operations. The CEB 70 will also be passed up to the Virtual Machine as part of the Query Device Structure for a Query Device SVC.

While the invention has been particularly shown and described with reference to the preferred embodiment thereof, it will be understood by those persons skilled in the art, that various changes in the form and detail may be made without departing from the scope and spirit of the invention.

We claim:

1. A method for use in a virtual machine type data processing system which comprises a main processor, a coprocessor, a first device independent operating system which executes directly only on said main processor and a second device dependent operating system which executes directly only on said coprocessor, and a Virtual Resource Manager consisting of a plurality of interrelated programming components which are executable on said main processor for selectively establishing at least two different type virtual machines which operate to process first and second application programs, each of which runs under a different one of said operating systems, said method comprising the following steps;
    (A) establishing with said Virtual Resource Manager, a first virtual machine that employs said main processor and one of said operating systems to process said first application program,
    (B) establishing in said VRM, a coprocessor programming subsystem component comprising a plurality of programming subcomponents which function to define a virtual machine interface to said coprocessor, and
    (C) establishing with said coprocessor programming subsystem a second type virtual machine that employs said coprocessor and said device dependent operating system to process said second application program.

2. The method recited in claim 1 in which said data processing system includes an Input/Output Channel (I/O) and an I/O Channel Controller, further including the step of;
    (a) establishing an information transfer path between said coprocessor and said main processor which includes said I/O Channel and said I/O Channel Controller.

3. The method recited in claim 2 in which said data processing system includes a plurality of I/O devices connected to said I/O channel, further including the step of;
    (a) assigning with said coprocessor programming subsystem selected I/O devices to said second virtual machine.

4. The method recited in claim 3 in which said system includes a system memory and a Memory Manager Unit and additional memory attached to said I/O Channel for exclusive use by said coprocessor, further including the step of;
    (a) storing said operating system programs and said application programs in said system memory,
    (b) establishing a second data transfer path including said I/O Channel Controller between said system memory and said coprocessor, and
    (c) transferring data between said coprocessor and said system memory during execution of said second application program by said second virtual machine.

5. The method recited in claim 4 in which the architecture of said coprocessor is different than the architecture of said main processor and at least one of said I/O devices has operating characteristics that are incompatible with said architecture of said coprocessor, further including the steps of;
    (a) assigning with said coprocessor programming subsystem component said one I/O device to said virtual machine employing said coprocessor, and
    (b) using said main processor to correlate the data transferring operations between said one I/O device and said coprocessor.

6. The method recited in claim 5 in which said step of using further includes the step of,
    (A) simulating control signals to said coprocessor and to said one I/O device with said main processor to take advantage of at least one of said operating characteristics of said one I/O device that is incompatible with the architecture of said coprocessor.

7. The method recited in claim 6 in which said coprocessor has an architecture which permits runnig a DOS operating system and said main processor has an architecture which permits running a Unix type operating system, including the further steps of,
    (A) running said first virtual machine under said Unix type operating system on said main processor, and
    (B) running said second virtual machine under said DOS operating system on said coprocessor.

* * * * *